(12) United States Patent
Bertolotti et al.

(10) Patent No.: US 9,297,360 B2
(45) Date of Patent: Mar. 29, 2016

(54) WIND TURBINE

(75) Inventors: Fabio Bertolotti, Bad Bentheim (DE); Hermann Kestermann, Rheine (DE); Marc-Andre Thier, Ascheberg (DE); Tobias Bueltel, Rheine (DE); Josef Upsing, Rheine (DE); Tobias Daemberg, Thuine (DE); Norbert Wibben, Salzbergen (DE)

(73) Assignee: SSB Wind Systems GmbH & Co. KG, Salzbergen (DE)

( * ) Notice: Subject to any disclaimer, the term of this patent is extended or adjusted under 35 U.S.C. 154(b) by 300 days.

(21) Appl. No.: 13/510,223

(22) PCT Filed: Oct. 14, 2010

(86) PCT No.: PCT/EP2010/065372
§ 371 (c)(1),
(2), (4) Date: May 16, 2012

(87) PCT Pub. No.: WO2011/061015
PCT Pub. Date: May 26, 2011

(65) Prior Publication Data
US 2012/0223523 A1    Sep. 6, 2012

(30) Foreign Application Priority Data

Nov. 17, 2009  (DE) .......................... 10 2009 044 570

(51) Int. Cl.
*F03D 9/00*     (2006.01)
*H02P 9/04*     (2006.01)
(Continued)

(52) U.S. Cl.
CPC .............. *F03D 7/024* (2013.01); *F03D 7/0208* (2013.01); *F03D 7/0224* (2013.01); *F03D 7/0244* (2013.01); *F03D 7/047* (2013.01); *Y02E 10/721* (2013.01); *Y02E 10/723* (2013.01)

(58) Field of Classification Search
CPC ..... F03D 7/0208; F03D 7/0224; F03D 7/024; F03D 7/0244; F03D 7/047; Y02E 10/721; Y02E 10/723
USPC .................................................. 290/44, 55
See application file for complete search history.

(56) References Cited

U.S. PATENT DOCUMENTS 3,876,846 A * 4/1975 Graybill .......................... 218/68
3,987,260 A * 10/1976 Wilson ............................ 218/79
(Continued)

FOREIGN PATENT DOCUMENTS

DE   10 2005 034899 A1   2/2007
DE   10 2006 009127 A1   9/2007
(Continued)

OTHER PUBLICATIONS

International Search Report (in German with English translation) and Written Opinion (in German) for PCT/EP2010/065372, mailed May 3, 2011; ISA/EP.

*Primary Examiner* — Tulsidas C Patel
*Assistant Examiner* — Thomas Quigley
(74) *Attorney, Agent, or Firm* — Harness, Dickey & Pierce, P.L.C.

(57) ABSTRACT

The disclosure relates to a wind turbine having a machine support (5), a rotor (6) which can be driven by wind (13) to rotate about the rotor axis (7) and is mounted so that it can rotate on the machine support (5) about a rotor axis (7). The rotor includes a rotor hub (8) and several rotor blades (9, 10) which extend respectively in the direction of a blade axis (11, 12) running transverse or essentially transverse to the rotor axis (7). The rotor blades (9,10) are mounted so that they can rotate on the rotor hub (8) about the respective blade axis (11, 12). Blade angle adjustable drives (17, 18) are arranged on the rotor (6) and enable the rotor blades (9, 10) to rotate about the blade axes thereof (11, 12). A blade angle control device (24) is coupled to the blade angle adjusting drives (17, 18) and can control the blade angle adjusting drives (17, 18). An electric generator (15) is mechanically coupled to the rotor (6) and can be driven by the rotor to generate electric energy. The blade angle control device (24) includes several control units (22, 23) which are respectively coupled to the blade angle adjusting drives (17, 18) enabling a first control unit (22) to be fixed to the rotor (6) and a second control unit (23) to be fixed to the machine support.

30 Claims, 10 Drawing Sheets

Figure 1:
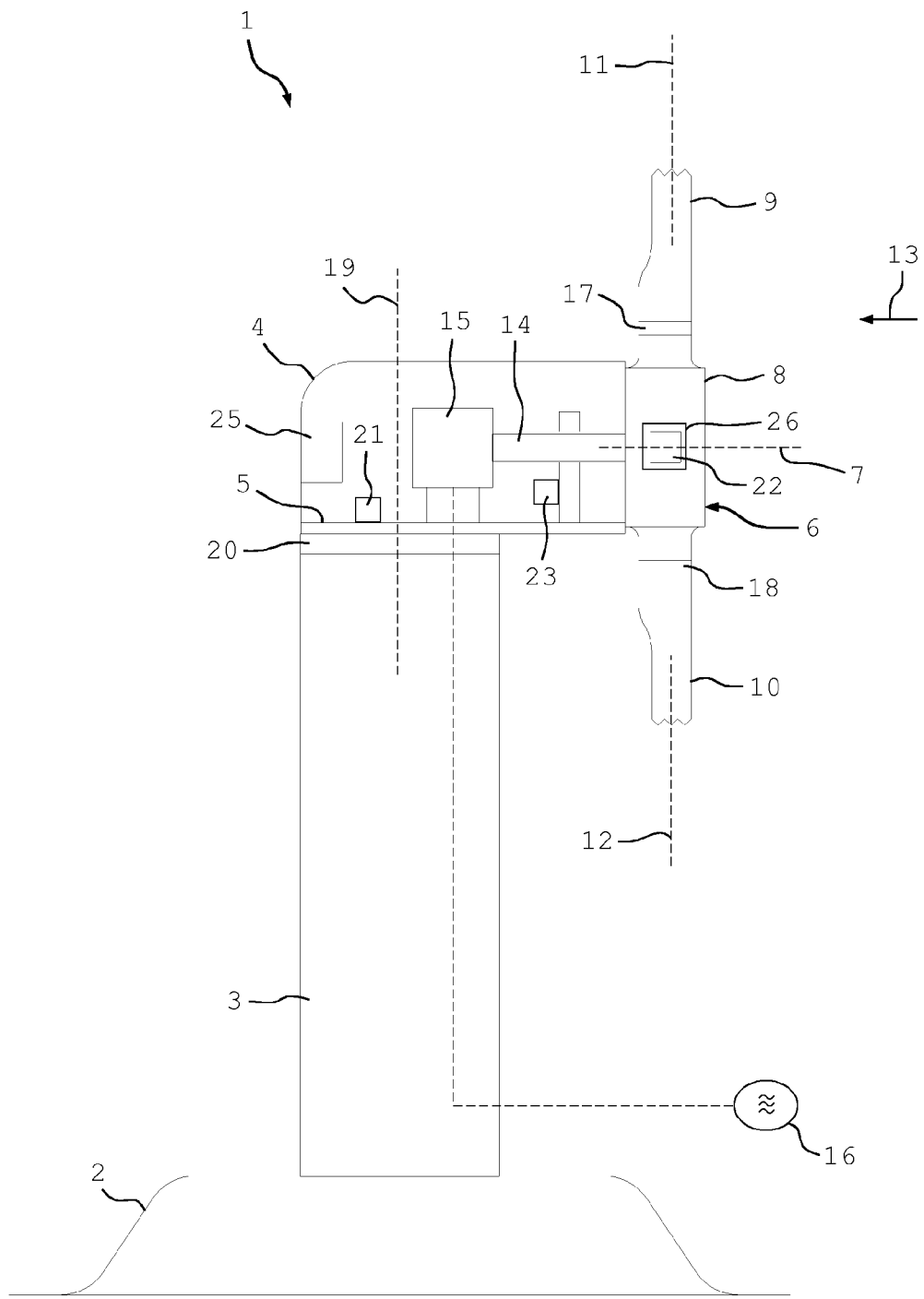

(51) Int. Cl.
*F03D 7/02* (2006.01)
*F03D 7/04* (2006.01)

(56) References Cited

U.S. PATENT DOCUMENTS

| | | | | |
|---|---|---|---|---|
| 4,216,521 | A * | 8/1980 | Merola | 361/617 |
| 4,265,583 | A * | 5/1981 | Baird et al. | 414/284 |
| 4,291,363 | A * | 9/1981 | Oishi | 361/604 |
| 4,295,021 | A * | 10/1981 | Asinovsky et al. | 218/34 |
| 6,441,507 | B1 * | 8/2002 | Deering et al. | 290/44 |
| 6,888,262 | B2 * | 5/2005 | Blakemore | 290/44 |
| 7,061,133 | B1 * | 6/2006 | Leijon et al. | 290/44 |
| 7,109,600 | B1 * | 9/2006 | Bywaters et al. | 290/55 |
| 7,256,509 | B2 | 8/2007 | Brandt et al. | |
| 7,288,850 | B2 * | 10/2007 | Hicks et al. | 290/44 |
| 7,888,915 | B2 * | 2/2011 | Zhao et al. | 322/47 |
| 2006/0163882 | A1 | 7/2006 | Brandt | |
| 2007/0267872 | A1 * | 11/2007 | Menke | 290/44 |
| 2008/0290664 | A1 | 11/2008 | Kruger | |
| 2009/0001726 | A1 | 1/2009 | Warfen et al. | |
| 2009/0230689 | A1 * | 9/2009 | Burra et al. | 290/55 |
| 2010/0143116 | A1 * | 6/2010 | Zang et al. | 416/1 |
| 2010/0259045 | A1 | 10/2010 | Vilbrrandt | |
| 2011/0064573 | A1 * | 3/2011 | Viripullan et al. | 416/1 |
| 2012/0177492 | A1 * | 7/2012 | Schomakers et al. | 416/9 |

FOREIGN PATENT DOCUMENTS

| | | |
|---|---|---|
| DE | 103 38 127 B4 | 9/2007 |
| DE | 102006057213 A1 | 6/2008 |
| EP | 1 707 807 A1 | 10/2006 |
| EP | 1 903 213 A2 | 3/2008 |
| EP | 1 942 273 A2 | 7/2008 |
| EP | 2 080 900 A2 | 7/2009 |
| WO | WO-2009/050157 A2 | 4/2009 |

* cited by examiner

WIND TURBINE

CROSS-REFERENCE TO RELATED APPLICATIONS

This application is a 371 U.S. National Stage of International Application No. PCT/EP2010/065372, filed Oct. 14, 2010, and claims priority to German Patent Application No. 10 2009 044 570.6 filed Nov. 17, 2009, the disclosures of which are herein incorporated by reference in their entirety.

The present invention relates to a wind turbine with a nacelle, a rotor mounted so it can rotate on the nacelle about a rotor axis and which can be driven by wind to rotate about the rotor axis, said rotor comprising a rotor hub and a plurality of rotor blades which extend respectively in the direction of a blade axis running transverse or substantially transverse to the rotor axis and are mounted so that they can rotate on the rotor hub about their respective blade axis, blade angle adjustment drives arranged on the rotor, by means of which the rotor blades can rotate about their blade axes, at least one blade angle control device coupled to the blade angle adjustment drives, by means of which the blade angle adjustment drives can be controlled, and at least one electric generator mechanically coupled to the rotor and which can be driven by the latter, by means of which electrical energy can be generated.

Modern wind turbines comprise rotor blades rotatably mounted on a rotor, in which the angle of attack of the wind can be varied by individually altering the blade angle. Such a pitch-regulated wind turbine is known for example from DE 103 38 127 B4. In these wind turbines the pitch system for the adjustment of the rotor blades is arranged completely in the rotor, in other words in the rotating part of the wind turbine. The pitch system is connected to an a.c. network and comprises a d.c. motor for each rotor blade, as well as a converter associated with the control and regulating devices for adjusting the rotor blade. In the event of a failure or interruptions in the network it must be ensured that the voltage supply of the motor is maintained at least for a short period. The pitch system for each rotor blade therefore includes a d.c. source arranged in the rotor in the form of a battery or an electrical energy storage device, which is connected directly to the respective motor in the event of network interruptions. The respective rotor blade is brought into the feathered pitch position by the adjustment movement of the motor and the wind turbine is thereby switched off. In addition, in the known pitch system a connection of each d.c. source to the respective motor via switching equipment is possible through the blade angle control device arranged in the rotor, so that an indirect, controlled or regulated adjustment of the rotor blade can take place without the wind turbine having to be switched off.

EP 1 707 807 A2 shows a further pitch system for a wind turbine with a d.c. drive for the blade adjustment. The voltage rectification for the motor is carried out with the aid of a bridge circuit, which includes active electronic switching elements and at the same time serves as an energy source for the pitch system in the event of a network failure or interruptions. Here too the pitch system is completely arranged in the rotating part of the wind turbine.

The arrangement of the pitch system in the rotating part of the wind turbine is associated with considerable disadvantages. During the rotation the components of the pitch system are subjected to a large number of fatigue processes, caused by the movement of the rotor. The components must therefore be specially designed both mechanically and electrically in particular as regards their rotational movement, with the result that the production costs of the components are relatively high. The arrangement of the blade angle control device in the rotor is in addition associated with considerable effort and expenditure as regards communication of the pitch system with a wind turbine control arranged outside the rotor.

The complete arrangement of the pitch system in the rotor is furthermore associated with disadvantages as regards the maintenance of the wind turbine, since access to the pitch system in the rotating turbine part is very complicated and difficult for the service and maintenance staff. In addition to this the confined arrangement in the rotor requires additional equipment for the temperature control of this region.

Against this background the object of the invention is to be able to realise in a wind turbine of the type mentioned in the introduction, the blade angle control device at least partly with simpler components.

This object is achieved with a wind turbine according to claim 1. Preferred developments of the invention are disclosed in the subclaims.

The wind turbine according to the invention comprises a nacelle, a rotor mounted on the nacelle so as to rotate about a rotor axis and which can be driven by wind to rotate about the rotor axis, said rotor comprising a rotor hub and a plurality of rotor blades that extend respectively in the direction of a blade axis running transverse or substantially transverse to the rotor axis and are mounted so that they can rotate on the rotor hub about their respective blade axis, blade angle adjustment drives arranged on the rotor, by means of which the rotor blades can rotate about their blade axes, at least one blade angle control device coupled to the blade angle adjustment drives, by means of which the blade angle adjustment drives can be controlled, and at least one electric generator mechanically coupled to the rotor and which can be driven by the latter, by means of which electrical energy can be generated, wherein the blade angle control device comprises a plurality of control units coupled respectively to the blade angle adjustment drives, of which a first control unit is secured to the rotor and a second control unit is secured to the nacelle.

Due to the subdivision of the blade angle control device into a plurality of control units, of which the first control unit together with the rotor can rotate about the rotor axis relative to the second control unit arranged on the nacelle, a plurality of components of the blade angle control device, in particular the components of the second control unit, are provided on the nacelle, so that the number of the components rotatable about the rotor axis can be reduced. Accordingly fewer components have to be employed for a rotation around the rotor axis, which means cost savings can be made. For example, simple electrical contactors, which are not rotation-resistant, can be used in the second control unit. The invention is aimed in particular at keeping the number of components arranged in the rotor as small as possible.

Furthermore, on account of the smaller number of electrical components in the rotor there is the advantage that less heat is produced in the rotor, so that the danger of an overheating of components arranged in the rotor can be reduced. An additional advantage is the fact that, on account of the smaller number of electrical components in the rotor, more free space is created in the rotor, so that more movement space is available in the rotor for service and maintenance staff. Also, the cabling requirements can be reduced.

The blade angle control device is preferably supplied with electrical energy from an electrical power supply device. Furthermore, the electrical energy that can be generated by the generator can preferably be fed to an electric network. According to a modification of the invention the electric power supply device is electrically coupled to the network or is formed by the network. In the first case the power supply device can preferably be supplied with electrical energy from the network. The power supply device preferably forms an a.c. source, in particular a multiphase a.c. source, such as for example a three-phase network. The network is preferably an a.c. network, in particular a multiphase network, such as for example a three-phase network.

The blade angle adjustment drives can preferably be controlled and/or regulated by means of the first control unit. In particular the blade angle control device comprises one or a plurality of first electrical energy storage devices secured to the rotor and electrically coupled to the first control unit, by means of which, in particular in the event of a failure of the power supply device and/or of the network, the blade angle adjustment drives and/or the first control unit can be supplied at least temporarily with electrical energy. The first electrical energy storage devices allow in particular a withdrawal in case of emergency, so that the rotor blades can be rotated about their blade axes by means of the first control device respectively to a defined position that offers the smallest possible attack surface for the wind, also termed the feathered pitch setting.

Preferably the blade angle adjustment drives include electric motors, which in particular are designed as d.c. motors or as a.c. motors. According to a modification of the invention the electric motors can be electrically connected by means of the first control unit directly or indirectly to the first energy storage device(s). The direct connection is suitable in particular for d.c. motors. According to a development of the invention auxiliary converters or d.c.-a.c. inverters are secured to the rotor, wherein the electric motors can be connected by means of the first control unit to the first electrical energy storage device(s) via interconnection of the auxiliary converters or d.c.-a.c. inverters. This indirect connection is suitable in particular for a.c. motors. The blade angle control device can include the auxiliary converters or d.c.-a.c. inverters.

The first energy storage device(s) are in particular formed respectively as a d.c. source. Preferably the first energy storage device(s) include respectively at least one accumulator, at least one battery or at least one capacitor. Batteries and/or accumulators that are able to provide the electrical power required for the blade angle adjustment drives are commonly used energy storage devices. The capacitors include in particular double-layer capacitors, e.g. ultracaps, in which a very high energy density can be achieved. One or a plurality of the first energy storage devices are preferably associated with each of the blade angle adjustment drives.

The blade angle adjustment drives can preferably be controlled and/or regulated by means of the second control unit. In particular the blade angle adjustment drives can be controlled and/or regulated as desired by means of the first control unit or by means of the second control unit.

Preferably the second control unit comprises one or a plurality of converters, by means of which the blade angle adjustment drives can be controlled. In particular the converters comprise one or a plurality of d.c. intermediate circuits. According to a modification of the invention the converters comprise respectively a d.c. intermediate circuit. The converter(s) are preferably electrically connected to the blade angle adjustment drives. Furthermore the converter(s) are preferably connected to the power supply device.

According to a modification of the invention the second control unit comprises an input stage, which in particular is electrically coupled to the power supply device, an output stage that is electrically coupled to each blade angle adjustment drive, and a d.c. intermediate circuit arrangement connected between the input stage and the output stages. Compared to conventional solutions, in which a separate converter is provided for each blade angle adjustment drive, in this modification a plurality of output stages are coupled to the same d.c. intermediate circuit arrangement, which is supplied from simply one input stage. In this way cost savings can be made. The converter(s) preferably include the input stage, the output stages and the d.c. intermediate circuit arrangement.

The input stage is preferably a rectifying input stage, so that it acts or can act as a rectifier. Preferably the input stage includes a current converter, for example a rectifier. The output stages can preferably be controlled. In particular the output stages include respectively a controllable current converter, for example in the form of a transistor stage. Preferably each of the output stages comprises a plurality of controllable electrical switching elements, which are preferably connected together to form a bridge circuit. The switching elements are formed for example by transistors, in particular by IGBTs. The second control unit preferably comprises one or a plurality of controls, by means of which the output stages can be controlled. In particular a or at least one computer is provided, which wholly or partly includes or forms the control or controls. An advantage compared to conventional solutions is that a realisation is possible with only a single computer. The d.c. intermediate circuit arrangement preferably forms a d.c. connection, in particular a d.c. bus. One of the output stages is preferably associated with each of the blade angle adjustment drives, wherein each of the blade angle adjustment drives is electrically connected to its associated output stage and can be controlled and/or regulated by means of the latter.

According to a development of the invention the blade angle control device includes at least one second electrical energy storage device secured to the nacelle and electrically coupled to the second control unit, by means of which, in particular in the case of a temporary disruption of the power supply device and/or of the network voltage, the blade angle adjustment drives and/or the second control unit can be supplied at least temporarily with electrical energy. The second energy storage device serves in particular to ensure that in the event of a temporary interruption of the network voltage, the blade angle adjustment drives can continue to operate. Thus, the blade angle adjustment drives can preferably then also be controlled and/or regulated by means of the second control unit if they are supplied with electrical energy from the second energy storage device. In this way a temporary network voltage interruption, which is also termed LVRT (low voltage ride through), can be handled. The second control unit and/or the input stage includes in particular switching devices, by means of which a temporary network interference, in particular a temporary network voltage interruption, can be handled without having to switch off the wind turbine and/or disconnect the wind turbine from the network.

Preferably the second energy storage device can be electrically connected through the converter(s) to the blade angle adjustment drives. In particular the second energy storage device is electrically connected or can be electrically connected to the d.c. intermediate circuits of the converter(s). According to a development of the invention the second energy storage device is electrically connected to the d.c. intermediate circuit arrangement, so that the blade angle adjustment drives can be supplied with electrical energy from the second energy storage device via interconnection of the output stages. The second energy storage device forms in particular a or at least one d.c. source. Preferably the second energy storage device includes at least one battery, at least one accumulator or at least one capacitor.

The blade angle control device is in particular connected, preferably electrically, to a wind turbine control system. In particular the first control unit and/or the second control unit are connected to the wind turbine control system. Preferably the whole operation of the wind turbine can be monitored and controlled by means of the wind turbine control system. The blade angle control device and/or the second control unit preferably includes a line filter, which in particular is secured to the nacelle. Preferably only a single line filter is thus necessary, which is connected in particular to the wind turbine control system. Cost savings can therefore be made, since in conventional wind turbines as a rule a line filter arranged in the rotor is allocated to each drive. Also, the line filter can be joined via relatively simple connections to the wind turbine control system, since these connections do not have to be led out from the rotating rotor. Furthermore additional free space is created in the rotor.

According to a development of the invention the nacelle is mounted rotatably about a yaw axis on a carrier construction and by means of at least one yaw drive coupled to a yaw angle control can rotate relative to the carrier construction about the yaw axis, the second control unit being coupled in particular to the yaw angle control. The connection between the blade angle control device and the yaw angle control can be effected via a simple interface, since the connection does not have to be led out from the rotating rotor. The yaw drive preferably includes at least one a.c. motor, which can be controlled in particular by the yaw angle control. The carrier construction is in particular a tower.

Preferably the blade angle adjustment can be coordinated with the yaw angle control, and in particular it is possible to synchronise the yaw angle control with the blade angle adjustment. According to a modification of the invention the rotor blades can rotate about their blade axes depending on a yaw angle velocity or on a reference quantity influencing the latter.

According to a modification of the invention the second control unit is connected to the blade angle adjustment drives via connecting elements, which in particular include connecting lines. The connecting lines can include electrical and/or optical lines. Preferably the connecting lines include one or a plurality of communications lines, one or a plurality of control lines and/or one or a plurality of power supply lines. The one or plurality of control lines preferably include one or a plurality of electrical lines. The one or plurality of power supply lines preferably include one or a plurality of electrical lines. The connecting elements preferably include a plurality of slip rings, via which the connection line or lines are guided. The slip rings are provided in particular at the separation point between the rotor and nacelle. Preferably the slip rings are arranged on the rotor, in particular on the rotor shaft. The individual slip rings are preferably displaced relative to one another in the direction of the rotor axis. In particular the one or plurality of control lines and/or the one or plurality of power supply lines are guided via the slip rings. The one or plurality of communications lines preferably include one or a plurality of optical information transmission lines, in particular light waveguides. Preferably the connecting elements comprise at least one optical coupling device, which is provided in particular at the separation point between the rotor and nacelle. Preferably the optical coupling device is arranged radially in the centre relative to the rotor axis. Since optical lines are able to transmit a large amount of information simultaneously, the connection between the optical coupling device and the second control unit is preferably implemented simply by an optical line. A plurality of optical lines preferably run between the optical coupling device and the blade angle adjustment drives.

According to a development of the invention the blade angle adjustment drives preferably comprise respectively a switching device, which is also termed a motor panel. The switching devices are in particular coupled to the first control unit and/or to the second control unit and preferably include respectively a measuring device, by means of which measurement values can be collected at the respective blade angle adjustment drive.

According to a modification of the invention the blade angle adjustment drives include respectively at least one electric motor with a motor shaft. The electric motors are preferably the aforementioned electric motors of the blade angle adjustment drives and can therefore be designed as d.c. motors or as a.c. motors. Preferably the measuring devices include respectively a sensor system for recording the angular position and/or the angular velocity of the respective motor shaft. Furthermore the measuring devices preferably include respectively a sensor system for recording the temperature of the respective electric motor. According to a development of the invention the switching devices comprise respectively a brake device with a brake control for the respective blade angle adjustment drive and/or electric motor. The brake control is preferably coupled to the first control unit and/or to the second control unit. According to a modification of the invention the switching devices are coupled, in particular directly, to one another via the communications lines and/or the control lines. Furthermore at least one of the first energy storage devices can be allocated respectively to the switching devices.

According to a development of the invention a switchgear cabinet is associated with the first control unit, the switchgear cabinet preferably being arranged radially in the centre or approximately radially in the centre in the rotor with respect to the rotor axis. Preferably the switchgear cabinet comprises internal partitions, which subdivide the inner chamber of the switchgear cabinet into a plurality of separate regions, which are preferably respectively bounded by an outer wall of the switchgear cabinet, the number of regions corresponding in particular to the number of blade angle adjustment drives. The internal partitions can be produced for example mechanically by folding, so that no welding work is required for their fabrication. The regions are preferably electrically insulated from one another. Due to the radially central arrangement of the switchgear cabinet in the rotor, installation space can be saved, so that more free room is available for service and maintenance staff. The switchgear cabinet is preferably in the shape of a polygon. According to a modification of the invention the switchgear cabinet surrounds the rotor axis.

Each of the first energy storage devices can be arranged and/or secured on that blade angle adjustment drive with which it is associated. In particular it is possible to flange connect each of the first energy storage devices directly to the respective motor and/or to the respective motor panel (switching device). Preferably the first energy storage device(s) are however arranged in close spatial proximity to one another and at a distance from the blade angle adjustment drives. Preferably the first energy storage device(s) are arranged in the region of the switchgear cabinet. In particular the first energy storage device(s) are arranged on or in the switchgear cabinet. Preferably the first energy storage device(s) are secured outside the switchgear cabinet to its outer wall or outer walls. For the service and maintenance staff the first energy storage device(s) are therefore simpler to maintain and/or replace.

The first control unit is arranged in particular in the switchgear cabinet. Preferably the first control unit comprises a plurality of partial control units, each of the partial control units being arranged in one of the regions. Preferably each of the partial control units is associated with one of the blade angle adjustment drives. In particular the number of partial control units corresponds to the number of blade angle adjustment drives.

According to a first variant of the invention the one or plurality of communications lines, the one or plurality of control lines and the one or plurality of power supply lines of each of the switching devices or of each of the blade angle adjustment drives are led to the first and/or to the second control unit. According to a second variant of the invention the individual switching devices or blade angle adjustment drives are connected to one another in series via the one or plurality of communications lines and/or via the one or plurality of control lines. In this case it is possible to guide the one or plurality of communications lines and/or the one or plurality of control lines from simply one of the switching devices or from simply one of the blade angle adjustment drives, to the first and/or second control unit. The one or plurality of power supply lines are preferably however led from each of the switching devices or from each of the blade angle adjustment drives to the first and/or second control unit.

The expression "secured to the rotor" is understood in particular to mean that objects secured to the rotor can rotate together with the rotor about the rotor axis. These objects include for example the first control unit, the first energy storage device(s), the switching devices and/or the blade angle adjustment drives. The securement of the object on the rotor can be effected in each case indirectly or directly, for example by one or a plurality of holders or other intermediate elements. Furthermore the expression "secured to the nacelle" is understood in particular to mean that objects secured to the nacelle cannot rotate together with the rotor about the rotor axis. These objects include for example the second control unit, the second energy storage device, the line filter and/or the yaw angle control. The securement of the objects to the nacelle can take place respectively indirectly or directly, for example via one or a plurality of holders or other intermediate elements. In particular objects secured to the rotor can thus rotate together with the rotor about the rotor axis relative to objects secured to the nacelle. For example, the first energy storage device(s) can rotate together with the rotor about the rotor axis relative to the second energy storage device.

The invention furthermore relates to a method for adjusting a blade angle of at least one rotor blade of a wind turbine according to the invention, by rotating the rotor blade about its blade axis, wherein the blade angle adjustment of the rotor blade is performed as desired by means of the second control unit secured to the nacelle or by means of the first control unit secured to the rotor. The wind turbine can be developed according to all the aforementioned modifications.

The blade angle is preferably regulated in the blade angle adjustment by means of the second control unit. The blade angle is preferably adjusted to a defined angle, corresponding in particular to the feathered pitch, in the blade angle adjustment by means of the first control unit.

According to a development of the invention, in the case of the blade angle adjustment by means of the first control unit, in particular in the case of an interruption, such as for example a failure of the power supply device and/or of the network, the blade angle adjustment drives are supplied with electrical energy from one or a plurality of first electrical energy storage devices secured to the rotor and coupled to the first control unit.

According to a modification of the invention, in the case of the blade angle adjustment by means of the second control unit, in particular in the case of an interruption, such as for example an interference of the power supply and/or network voltage, the blade angle adjustment drives are supplied with electrical energy from at least one second energy storage device coupled to the second control unit and secured to the nacelle.

The blade angle adjustment device preferably comprises a switching device, by means of which a switchover from a power supply of the blade angle adjustment drives by an electric network to the power supply of the blade angle adjustment drives by the energy storage device(s) takes place.

Figure 2:
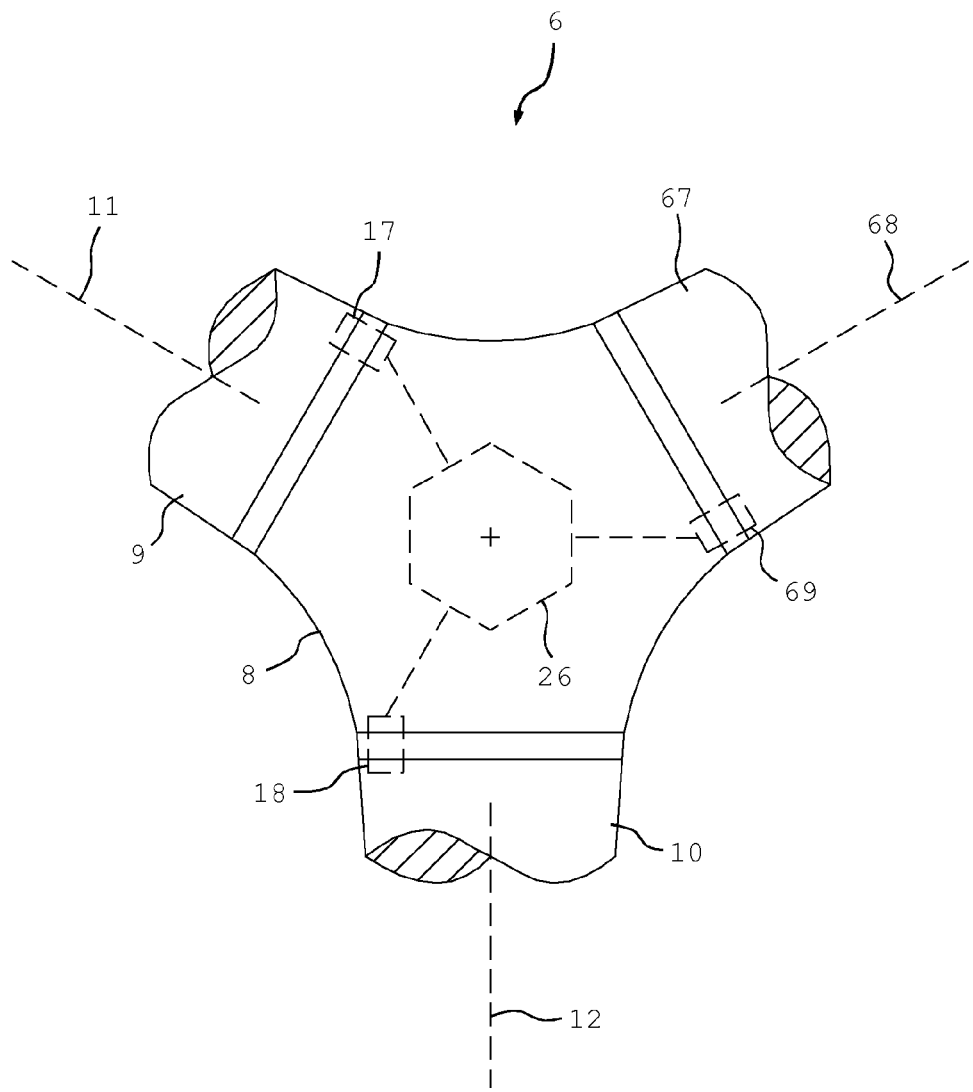
Figure 3:
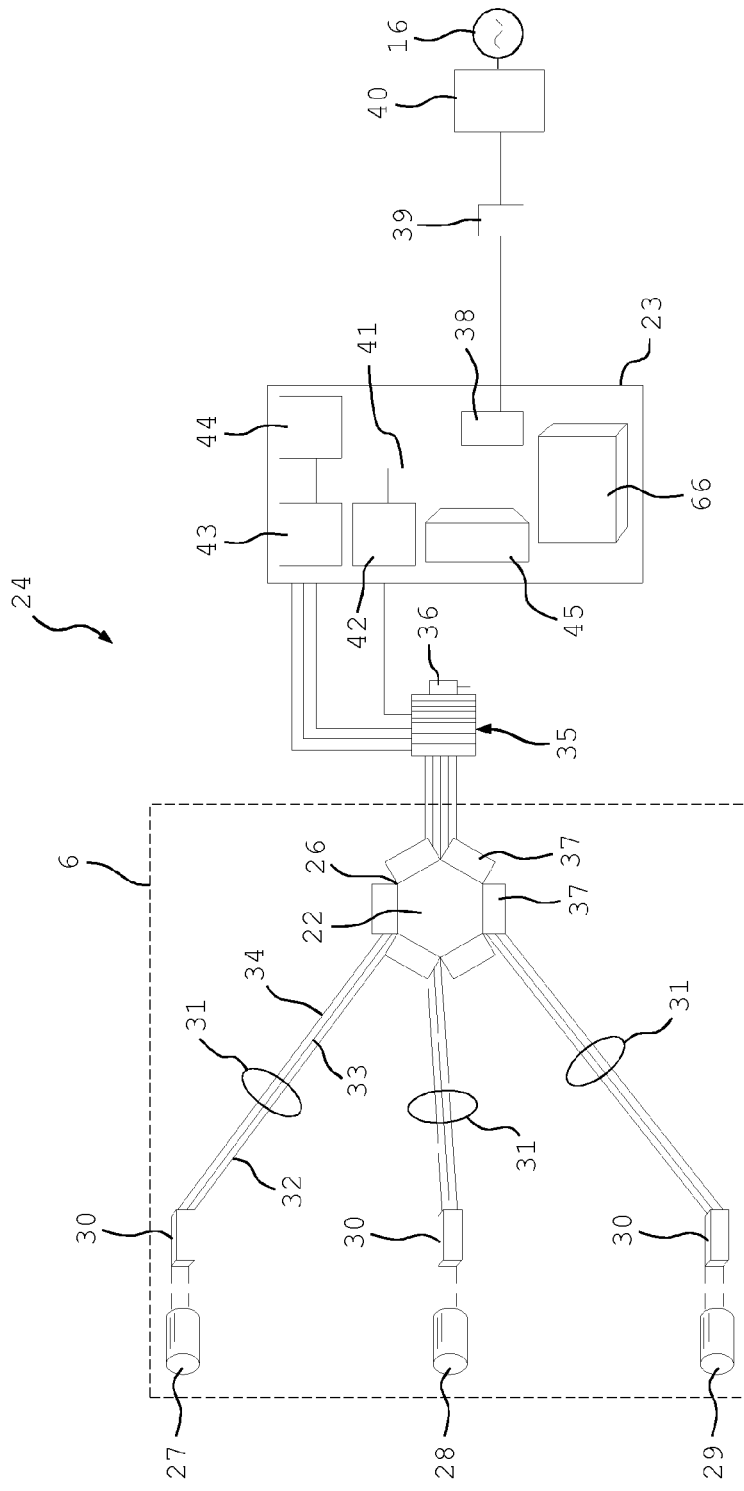
Figure 4:
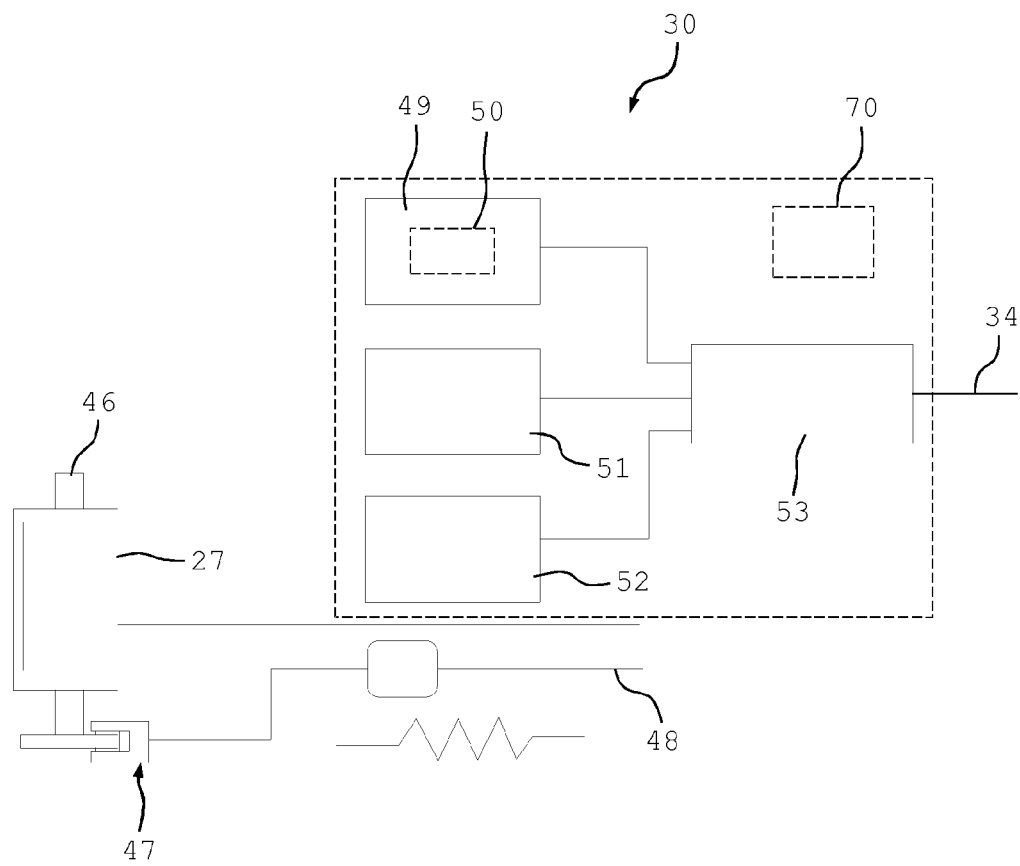
Figure 5:
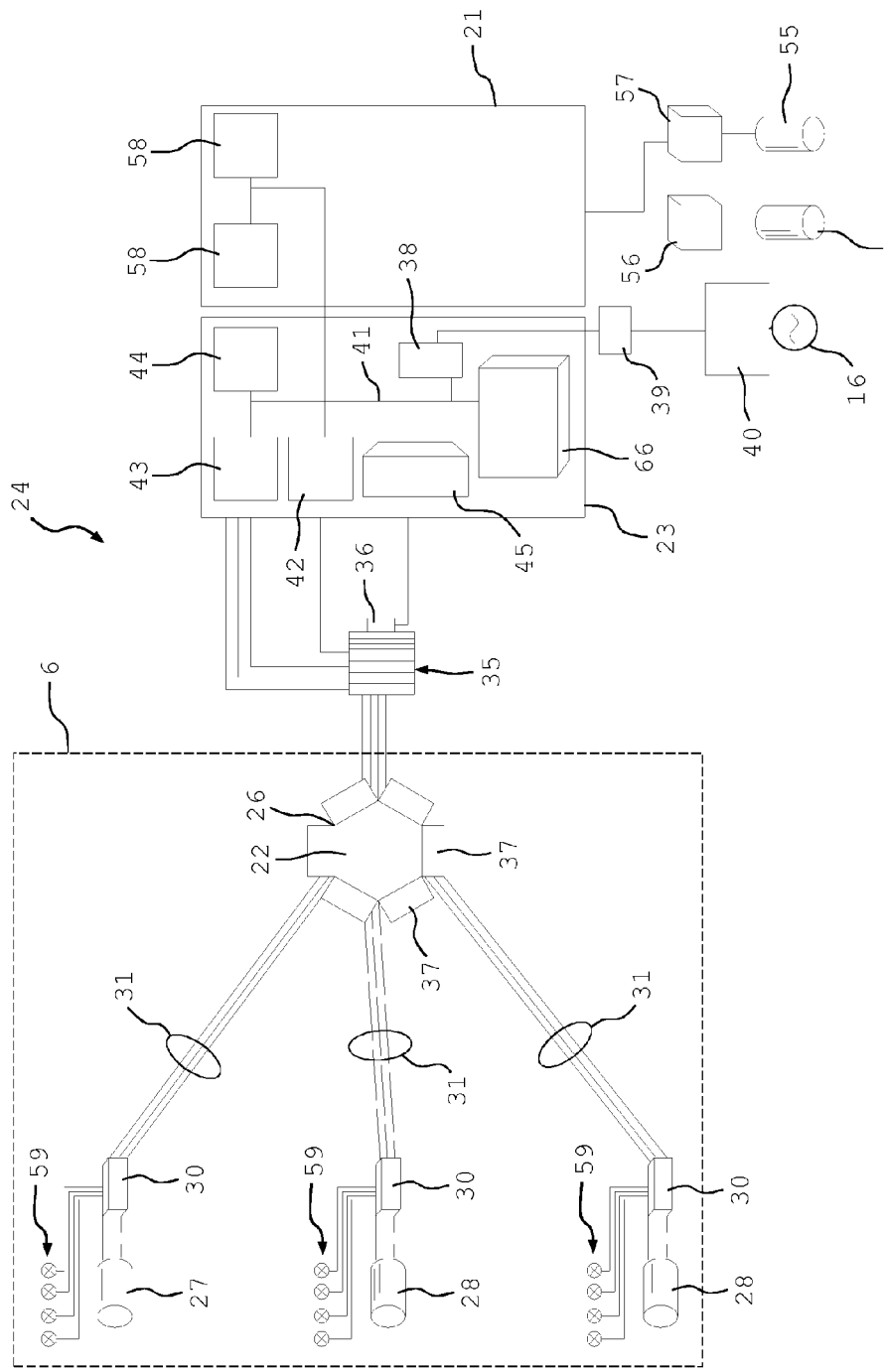
Figure 6:
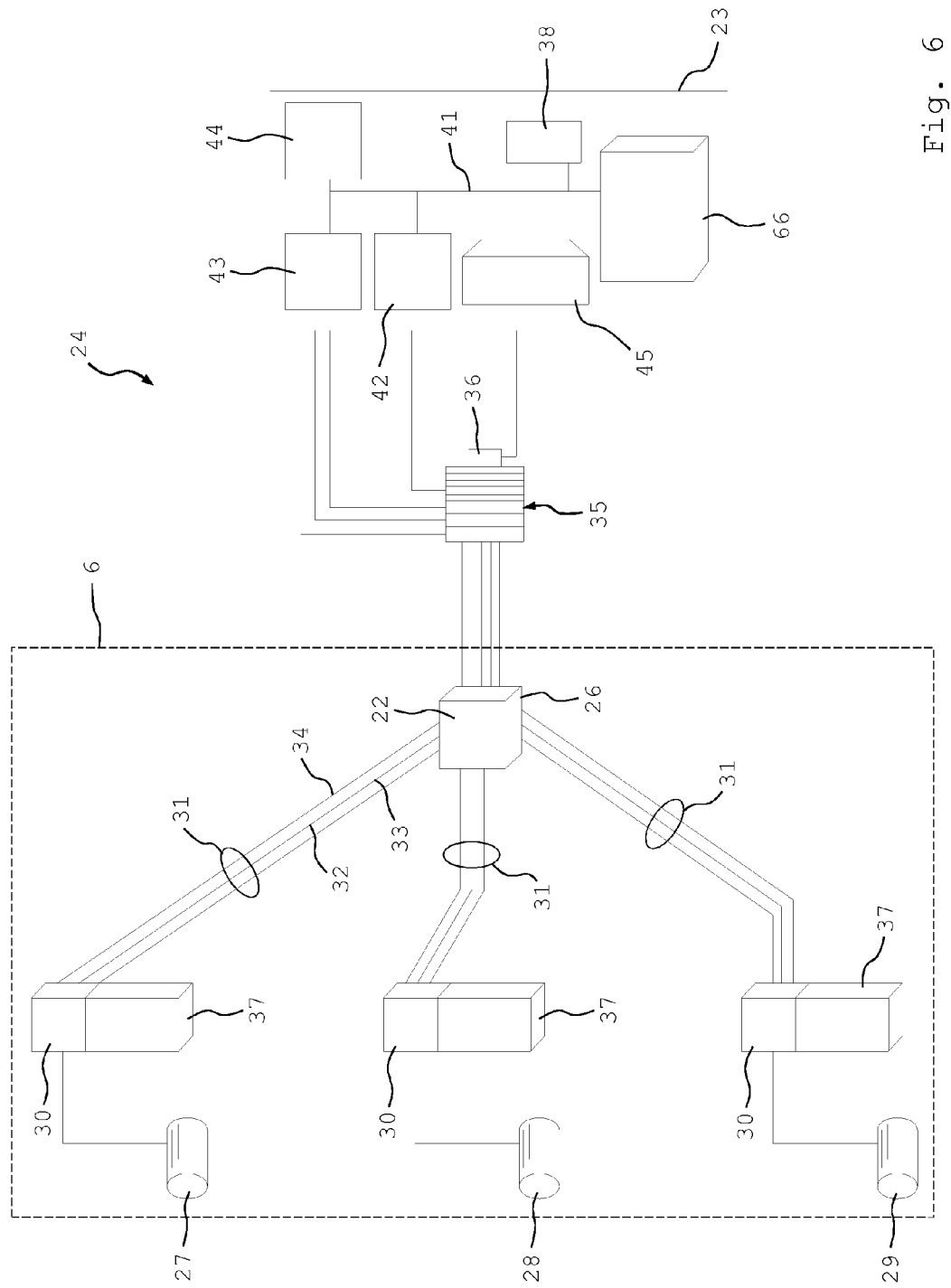
Figure 7:
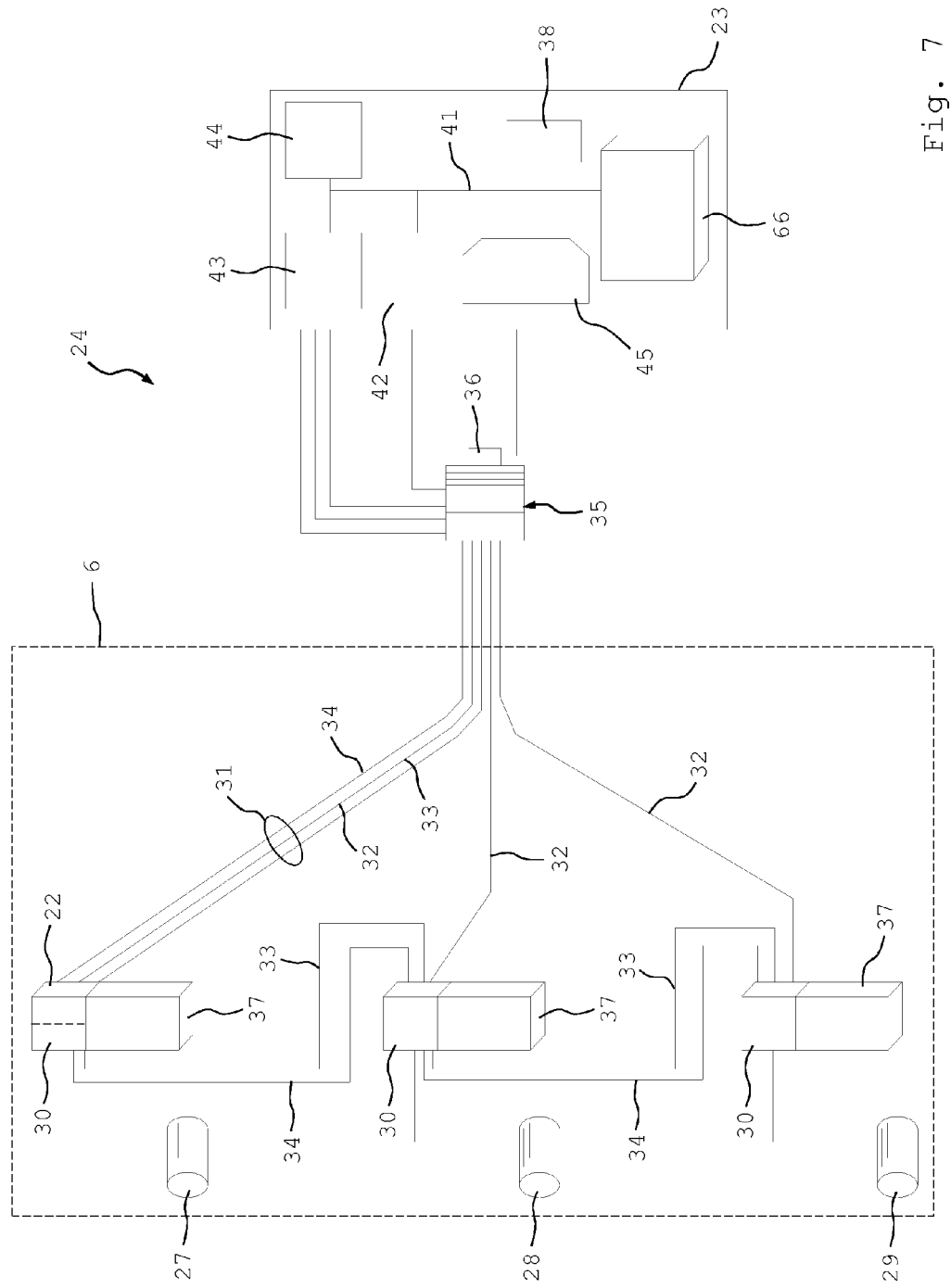
Figure 8:
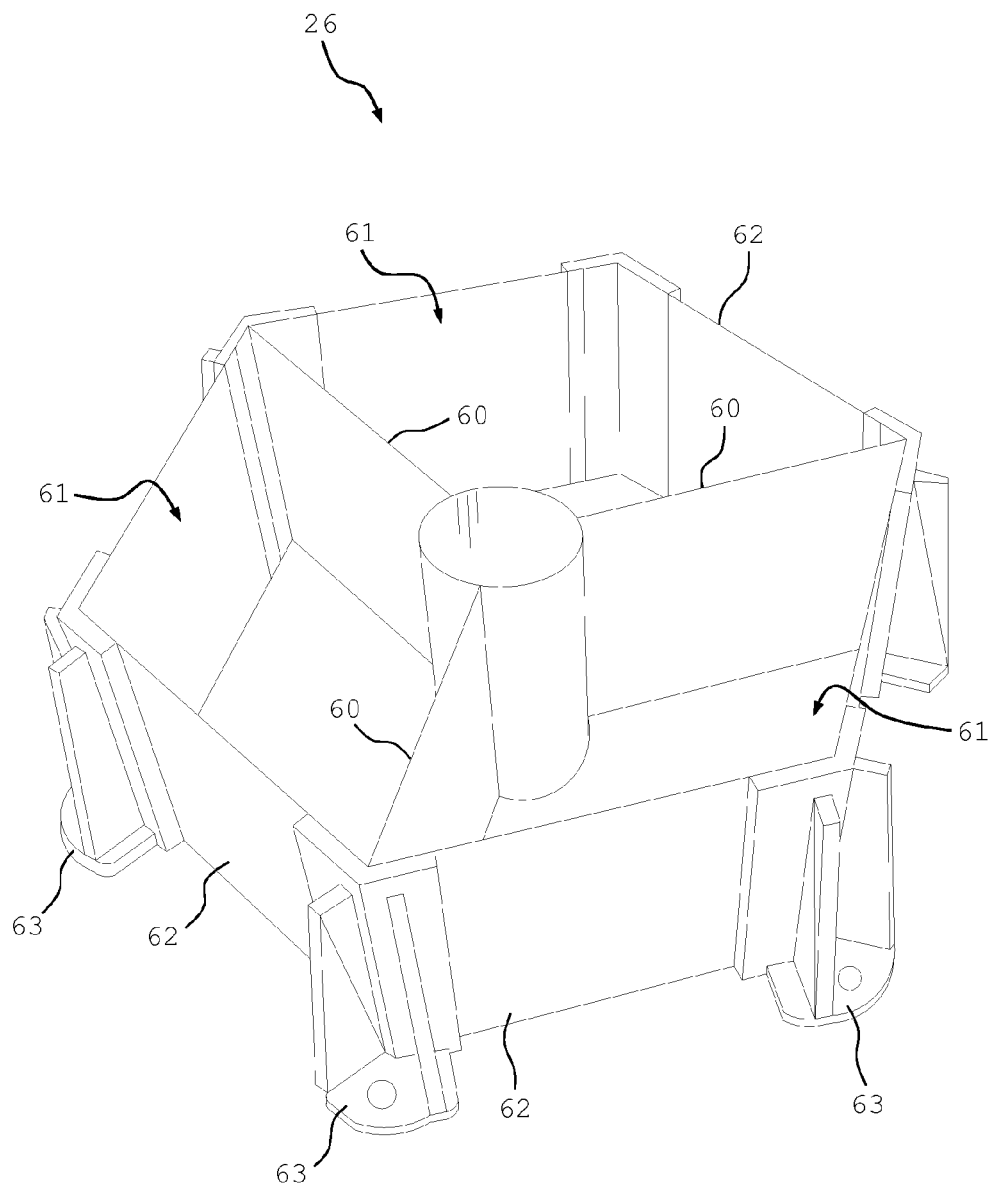
Figure 9:
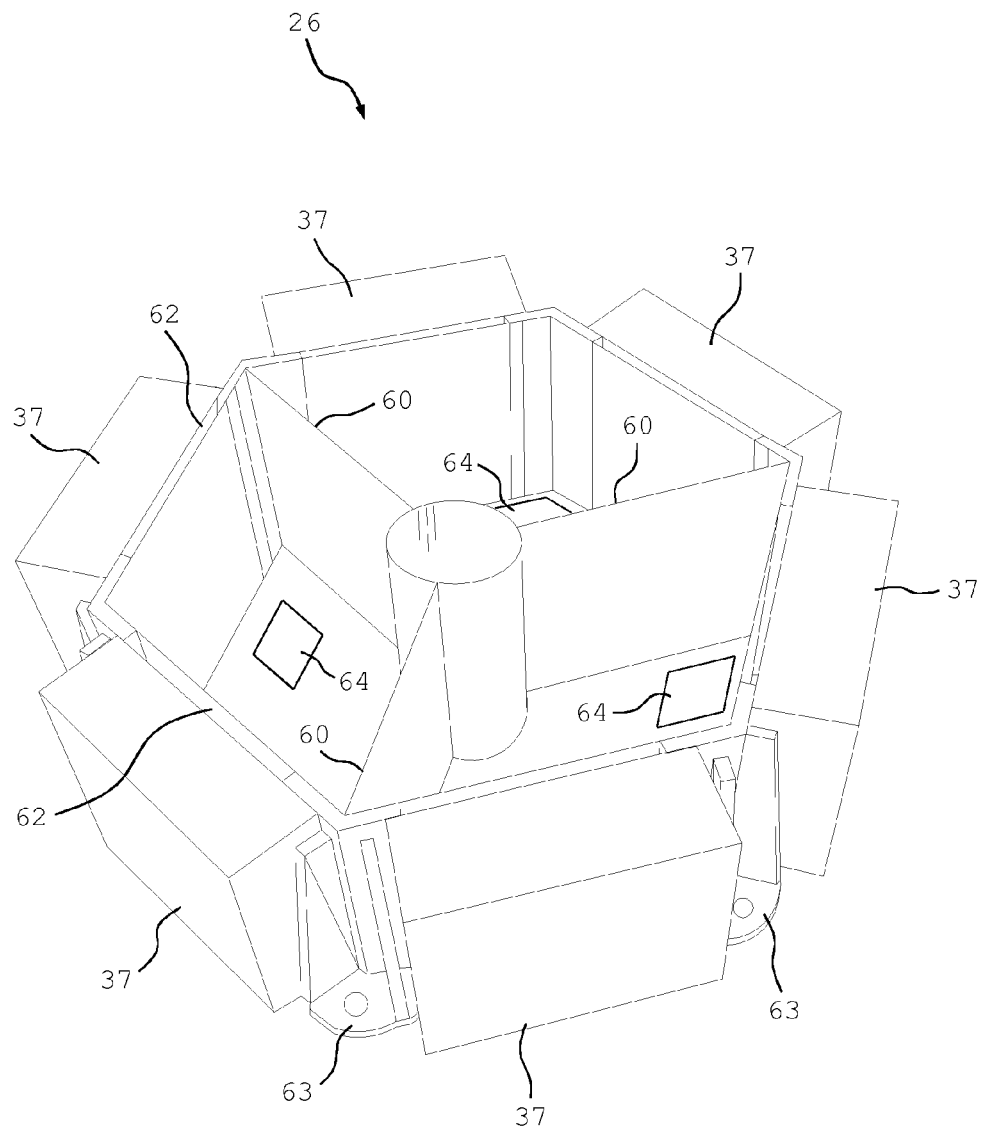
Figure 10:
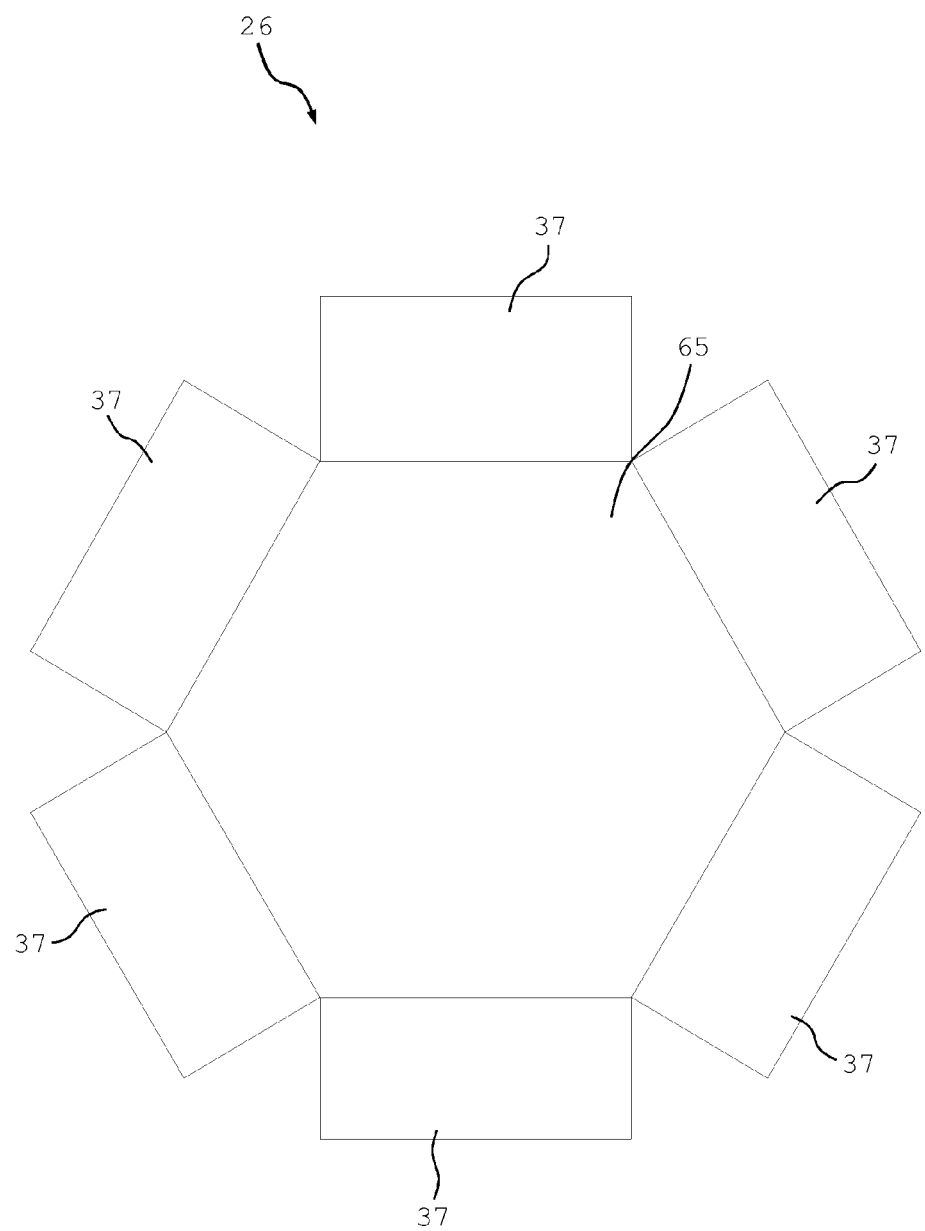

The invention is described hereinafter with the aid of preferred embodiments and with reference to the accompanying drawings, in which:

FIG. 1 is a schematic representation of a wind turbine according to a first embodiment of the invention, FIG. 2 is a partial front view of the rotor visible in FIG. 1, FIG. 3 is a schematic representation of a blade angle adjustment device according to the first embodiment, FIG. 4 is a schematic representation of a motor panel according to the first embodiment, FIG. 5 is a schematic representation of a blade angle adjustment device according to a second embodiment of the invention, FIG. 6 is a schematic representation of a blade angle adjustment device according to a third embodiment of the invention, FIG. 7 is a schematic representation of a blade angle adjustment device according to a fourth embodiment of the invention, FIG. 8 is a perspective representation of a switchgear cabinet according to the first embodiment in the opened state, FIG. 9 is a perspective representation of the switchgear cabinet according to FIG. 8 with installed accumulators, and FIG. 10 is a plan view of the switchgear cabinet according to FIG. 8 in the closed state and with installed accumulators.

A wind turbine 1 according to a first embodiment of the invention can be seen in FIG. 1, in which the wind turbine 1 comprises a tower 3 standing on a foundation 2, a machine housing 4 being arranged on the end of the tower remote from the foundation 2. The machine housing 4 comprises a nacelle 5 or is secured thereto, on which a rotor 6 is rotatably mounded about a rotor axis 7, the rotor comprising a rotor hub 8 and a plurality of rotor blades 9, and 67 (see FIG. 2) connected thereto, which are respectively rotatably mounted about a blade axis 11, 12 and 68 (see FIG. 2) on the rotor hub 8. The rotor blades 9, 10 and 67 extend in the direction of their respective blade axes 11, 12 and 68 from the rotor hub 8, the blade axes 11, 12 and 68 running transverse to the rotor axis 7. The rotor 6 is rotated about the rotor axis 7 by the wind 13 and is mechanically coupled by means of a rotor shaft 14 to an electric generator 15 secured to the nacelle 5, the generator being driven by the rotor 6. The generator 15 generates electrical energy and feeds this into an external electric network 16. The rotor blades 9, 10 and 67 can rotate respectively via a blade angle adjustment drive 17, 18 and 69 about their respective blade axis 11, 12 and 68 relative to the rotor hub 8. FIG. 2 shows a partial front view of the rotor 6.

The nacelle 5 is mounted on the tower 3 so that it can rotate about a yaw axis 19 and by means of a yaw drive 20 can rotate about the yaw axis 19 relative to the tower 3, the yaw axis coinciding in this case with the longitudinal axis of the tower 3. The yaw drive 20 can be controlled by means of a yaw control system 21 secured to the nacelle 5.

The blade angle adjustment drives 17, 18 and 69 are connected respectively to a first control unit 22 arranged in the rotor 6 and to a second control unit 23 secured to the nacelle 5. The two control units 22 and 23 are part of a blade angle control device 24 visible in FIG. 3. Furthermore the yaw angle control 21 and the blade angle control device 24 are electrically connected to a wind turbine control system 25, which according to this embodiment is secured to the nacelle 5. A switchgear cabinet 26, in which the first control unit 22 is housed, is arranged radially centrally in the rotor hub 8 and is secured thereto.

The blade angle control device 24 can be seen in FIG. 3, the rotor 6 being illustrated schematically as a box identified by dotted lines. The blade angle adjustment drives 17, 18 and 69 comprise respectively an electric motor, the electric motor 27 being associated with the blade angle adjustment drive 17, the electric motor 28 with the blade angle adjustment drive 18, and the electric motor 29 with the blade angle adjustment drive 69. The electric motors 27, 28 and 29 are connected respectively via a switching device (motor panel) 30 and connecting lines 31 to the first control unit 22 and also to the second control unit 23. The connecting lines include electrical power supply lines 32, electrical control lines 33 and communications lines 34, the latter being in the form of light waveguides. The power supply lines 32 and the control lines 33 are led over slip rings 35 mounted on the rotor shaft 14 to the second control unit 23. The communications lines 34 on the other hand are connected via an optical coupling device 36 (optical interface) arranged on the rotor axis 7, to the second control unit 23. Accumulators 37 are also shown, which are secured to the outside of the switchgear cabinet 26 and are electrically connected to the first control unit 22.

The second control unit 23 includes a rectifier 38, which is connected on the a.c. side via a line filter 39 to a power supply device 40, which supplies the second control unit 23 with alternating current and is connected to the network 16. Alternatively the line filter 39 can also be connected directly to the network 16, so that the power supply device 40 is omitted or is formed by the network 16.

The rectifier 38 is connected on the d.c. side to a d.c. bus 41, to which are connected three output stages 42, 43 and 44. The output stage 42 is connected via the power supply lines 32 of the motor 27 to the switching device 30 associated therewith. The output stage 43 is connected via the power supply lines 32 of the motor 28 to the switching device 30 associated therewith. Furthermore, the output stage 44 is connected via the power supply lines 32 of the motor 29 to the switching device 30 associated therewith. The motor 27 can be controlled by the output stage 42, the motor 28 can be controlled by the output stage 43, and the motor 29 can be controlled by the output stage 44. The rectifier 38 and the d.c. bus 41 form respectively a converter with each of the output stages. It could however also be said that the rectifier 38, the d.c. bus 41 and the output stages 42, 43 and 44 form a converter with three output stages.

The second control unit 23 includes a control 45, by means of the output stages 42, 43 and 44 can be controlled. It is therefore possible to trigger the motors 27, 28 and 29 of the blade angle adjustment drives 17, 18 and 69 by means of the second control unit 23. Furthermore, an accumulator 66 is connected to the d.c. bus 41. The accumulator 66 can be permanently electrically connected to the d.c. bus 41 or can be electrically connected to the d.c. bus 41 by means of the control 45 and/or the rectifier 38.

If there is a temporary voltage interruption of the network 16, the electrical supply to the d.c. bus 41 is provided by the accumulator 66. Accordingly, it is possible to continue operating the blade angle adjustment drives 17, 18 and 69 until the voltage interruption has passed and the full network voltage is restored. This has the advantage that the wind turbine 1 does not have to be switched off during a temporary voltage interruption. If however the length of the voltage interruption exceeds a predetermined duration or if the voltage drops below a predetermined threshold value, then the rotor blades 9, 10 and 67 are rotated by means of the first control unit 22 to the so-called feathered pitch position. In this case the power supply to the motors 27, 28 and 29 is provided by the accumulators 37. Since the motors 27, 28 and 29 are d.c. motors, the accumulators 37 are electrically connected directly to the motors 27, 28 and 29 by means of the first control unit 22. Alternatively the motor 27, 28 and 29 can however also be formed as a.c. motors, so that the connection of the accumulators 37 to the motors 27, 28 and 29 takes place via the interconnection of d.c.-a.c. inverters 70, which are preferably provided in the switching devices 30 (see FIG. 4). Alternatively the d.c./a.c. inverters can however also be provided in the first control unit 22 or can be connected at another point between the accumulators 37 and the motors 27, 28 and 29. The rotor blades can thus be turned to the feathered pitch position even if the second control unit 23 has failed and/or the accumulator 66 is discharged.

A schematic circuit diagram of the switching device 30 associated with the motor 27 is shown in FIG. 4, which comprises a motor shaft 46, which can be braked and/or held in position by means of a braking device 47. The braking device 47 is supplied with electrical energy via supply lines 48, wherein the power supply lines 32 preferably include the supply lines 48.

The switching device 30 comprises a temperature monitoring device 49 with a sensor system 50 for recording the temperature of the motor 27, a sensor system 51 for recording the angular position and angular velocity of the motor shaft 46, and a brake control 52, by means of which the braking device 47 can be controlled. The monitoring system 49, the sensor system 51 and the control 52 are respectively electrically connected to an optical communications device 53, which forms an interface with the communications lines 34. The d.c.-a.c. inverter 70 is also shown, but however can be omitted if the motor 27 is designed as a d.c. motor.

Further embodiments of the invention are shown in FIGS. 5 to 7, in which features identical or similar to those of the first embodiment are identified by the same reference numerals as in the first embodiment.

A blade angle control device 24 according to a second embodiment of the invention is shown in FIG. 5, in which the yaw angle control 21 is electrically connected to the second control unit 23. The yaw drive 20 comprises two electric motors 54 and 55, which are respectively connected via a converter 56, 57 to the yaw angle control 21. Furthermore the yaw angle control 21 comprises a plurality of controllable output stages 58, which are respectively connected to the d.c. bus 51. The output stages 58 are preferably connected to the blade angle adjustment drives, so that these can additionally be controlled by means of the yaw angle control 21, preferably depending on a yaw movement of the nacelle 5 about the yaw axis 19. Sensors 59 are furthermore shown in FIG. 5, which are associated with the switching devices 30.

A blade angle control device 24 according to a third embodiment of the invention can be seen in FIG. 6, in which the accumulators 37 are not arranged on the switchgear cabinet 26, but in the region of or on the motors 27, 28 and 29. In this connection one of the accumulators 37 is associated respectively with each of the switching devices 30.

A blade angle control device 24 according to a fourth embodiment of the invention is shown in FIG. 7, in which the arrangement of the accumulators 37 corresponds to the third embodiment. In contrast to the third embodiment, the first control unit 22 is however provided in the region of or on the motor 27, the switching devices 30 being connected in series to one another via the communications lines 34 and the control lines 33. The installation work can thus be reduced as regards the communications lines 34 and the control lines 33.

A perspective representation of the switchgear cabinet 26 according to the first embodiment is shown in the opened state in FIG. 8, in which the inner chamber of the switchgear cabinet is subdivided by internal partitions 60 into a plurality of regions 61, which are furthermore bounded by outer walls 62 of the switchgear cabinet 26. Exactly one of the regions 61 is associated with each of the blade angle adjustment drives 17, 18 and 69. The first control unit 22 includes a partial control unit 64 for each blade angle adjustment drive (see FIG. 9), wherein each of the partial control units 64 is arranged in one of the regions 61. Holders 63 on which the accumulators 37 can be mounted are secured to the outer sides of the outer walls 62.

A perspective view of the switchgear cabinet 26 together with the installed accumulators 37 is shown in FIG. 9, in which also the partial control units 64 arranged in the regions 61 are schematically illustrated. Two of the accumulators 37 are respectively associated with each of the blade angle adjustment drives, the accumulators being arranged on the outer wall 62 of the respective region 61. A plan view of the switchgear cabinet 26 with installed accumulators 37 is shown in FIG. 10, the switchgear cabinet 26 being closed with a lid 65.

The invention claimed is:

1. A wind turbine comprising:
 a nacelle;
 a rotor mounted on the nacelle for rotation about a rotor axis and adapted to be driven by wind to rotate about the rotor axis, the rotor including a rotor hub and a plurality of rotor blades each extending along a blade axis, and each said rotor blade extending substantially transverse to the rotor axis and being rotatable about its respective said blade axis;
 a plurality of blade angle adjustment drives associated with the plurality of rotor blades, each said blade angle adjustment drive having an electric motor and a switching device associated therewith arranged on the rotor and configured to rotate each of the rotor blades about its respective said blade axis;
 at least one blade angle control device coupled to the blade angle adjustment drives and configured to control the blade angle adjustment drives, the blade angle control device including:
 a first control unit secured to the rotor; and
 a second control unit secured to the nacelle, the second control unit including a power converter having separate output stages, the separate output stages being electrically connected to each of the switching devices, to thus supply output signals separately to each of the blade angle adjustment drives, from at the nacelle, to thus control the switching devices, and thus the electric motors, without the need for a power converter to be located in the rotor; and
 at least one electric generator mechanically coupled to the rotor as a driven member, whereby electrical energy can be generated.

2. The wind turbine according to claim 1, wherein the blade angle control device comprises at least a first electrical energy storage device secured on the rotor and electrically coupled to the first control unit, whereby the blade angle adjustment drives can be supplied at least temporarily with electrical energy.

3. The wind turbine according to claim 2, wherein the electric motors are electrically connected to the first electrical energy storage device by the first control unit.

4. The wind turbine according to claim 3, further comprising at least one of an auxiliary converter and an inverter which are secured to the rotor, wherein the electric motors are electrically connected by the first control unit to the first electrical energy storage device via interconnection of the auxiliary converter or the inverter.

5. The wind turbine according to claim 2, wherein the first electrical energy storage device comprises at least one of an accumulator and a capacitor.

6. The wind turbine according to claim 1, wherein the blade angle control device includes at least one second electrical energy storage device secured to the nacelle and electrically coupled to the second control unit, whereby the blade angle adjustment drives are supplied at least temporarily with electrical energy.

7. The wind turbine according to claim 6, wherein the second electrical energy storage device comprises at least one of:
 an accumulator; and
 a capacitor.

8. The wind turbine according to claim 6, wherein the second control unit comprises at least one converter, whereby the blade angle adjustment drives can be controlled.

9. The wind turbine according to claim 8, wherein the second electrical energy storage device is electrically connected via the converter to the blade angle adjustment drives.

10. The wind turbine according to claim 1, wherein the second control unit comprises a rectifying input stage and a d.c. intermediate circuit arrangement connected between the rectifying input stage and the output stages.

11. The wind turbine according to claim 10, wherein the second electrical energy storage device is electrically coupled to the d.c. intermediate circuit arrangement, so that the blade angle adjustment drives are supplied with electrical energy from the second electrical energy storage device via interconnection of the output stages.

12. The wind turbine according to claim 1, wherein the blade angle control device further comprises a line filter secured to the nacelle.

13. The wind turbine according to claim 1, further comprising a carrier construction supporting the nacelle for rotation about a yaw axis, and at least one yaw drive coupled to a yaw angle control which rotates about the yaw axis relative to the carrier construction, wherein the second control unit is coupled to the yaw angle control.

14. The wind turbine according to claim 1, wherein the second control unit is connected to the blade angle adjustment drives via connecting elements including communications lines, electrical control lines and electrical power supply lines.

15. The wind turbine according to claim 14, wherein the communications lines include optical information transmission lines.

16. The wind turbine according to claim 2, wherein each said switching device includes a measuring device.

17. The wind turbine according to claim 16, wherein each said electric motor includes a motor shaft, and wherein the measuring devices include respectively a first sensor system for recording the angular position and angular velocity of the respective motor shaft and a second sensor system for recording the temperature of the respective electric motor.

18. The wind turbine according to claim 16, wherein each of the switching devices comprises a braking device with a brake control for the blade angle adjustment drive, which is coupled to the first control unit and to the second control unit.

19. The wind turbine according to claim 16, wherein the switching devices are coupled to one another via a communications line and via control lines.

20. The wind turbine according claim 16, wherein the switching devices are associated respectively with the first electrical energy storage device.

21. The wind turbine according to claim 2, further comprising a switchgear cabinet which is associated with the first control unit, the switchgear cabinet being arranged radially centrally in the rotor with respect to the rotor axis.

22. The wind turbine according to claim 21, wherein the switchgear cabinet comprises internal partitions which subdivide an inner chamber of the switchgear cabinet into a plurality of separate regions, which are respectively bounded by an outer wall of the switchgear cabinet, wherein the plurality of separate regions corresponds to the number of the blade angle adjustment drives.

23. The wind turbine according to claim 22, wherein the plurality of regions include individual regions which are electrically insulated from one another.

24. The wind turbine according to claim 21, wherein the first electrical energy storage device comprises a plurality of first electrical energy storage devices which are arranged in close spatial proximity to one another and are spaced from the blade angle adjustment drives.

25. The wind turbine according to claim 24, wherein the first electrical energy storage devices are arranged on the switchgear cabinet.

26. The wind turbine according to claim 22, wherein the first electrical energy storage devices are secured outside the switchgear cabinet to the outer walls.

27. A method for adjusting a blade angle of at least one rotor blade of a wind turbine, the rotor blade being supported by a rotor and the rotor blade being rotatable about a blade axis thereof, and the rotor being rotated independently of a nacelle from which the rotor is supported to thus enable rotation of the rotor blade about a rotor axis extending generally perpendicular to the blade axis, the method comprising:
rotating the rotor blade about the blade axis with a blade angle adjustment drive, wherein a blade angle adjustment of the rotor blade is carried out using:
an electric motor housed in the rotor and having an associated switching device housed in the rotor;
a first control unit of the blade angle adjustment drive secured to the rotor, so as to rotate with the rotor, and
a second control unit of the blade angle adjustment drive secured to the nacelle, the second control unit being in communication with the first control unit and having a power converter having an output stage for generating signals, at the nacelle, for driving the switching device in the rotor, and thus controlling operation of the electric motor without the need for a power converter to be located within the rotor.

28. The method according to claim 27, wherein the blade angle adjustment drive is supplied with electrical energy from at least one first electrical energy storage device secured to the rotor and coupled to the first control unit.

29. The method according to claim 27, wherein the blade angle adjustment drive is supplied with electrical energy from at least one second electrical energy storage device secured to the nacelle and coupled to the second control unit.

30. The method according to claim 27, wherein the blade angle adjustment device comprises a changeover device, and where power being supplied to the blade angle adjustment drives from an electric network is switchable such that power is supplied to the blade angle adjustment drives from the at least one electrical energy storage device instead of from the electric network.

* * * * *